(12) United States Patent
Lopez et al.

(10) Patent No.: US 7,704,537 B2
(45) Date of Patent: Apr. 27, 2010

(54) CRISPY FLOUR TAQUITO

(75) Inventors: Andrea Alcantara Lopez, Menifee, CA (US); Lucy Alvarado, Chula Vista, CA (US); Troy Bonata, Poway, CA (US); James Matthews, Wexford, PA (US); W. Richard Dyer, Wexford, PA (US); Mark Rogers, Chula Vista, CA (US); Viviano Del Villar, San Diego, CA (US)

(73) Assignee: H.J. Heinz Company, Pittsburgh, PA (US)

( * ) Notice: Subject to any disclaimer, the term of this patent is extended or adjusted under 35 U.S.C. 154(b) by 936 days.

(21) Appl. No.: 11/033,504

(22) Filed: Jan. 12, 2005

(65) Prior Publication Data
US 2006/0110495 A1    May 25, 2006

Related U.S. Application Data

(60) Provisional application No. 60/630,240, filed on Nov. 24, 2004.

(51) Int. Cl.
    *A23P 1/08* (2006.01)
(52) U.S. Cl. .......................... 426/95; 426/94; 426/305; 426/439
(58) Field of Classification Search ............. 426/93–95, 426/282, 283, 549, 552, 553, 438–439, 496, 426/497, 502, 524, 241–243
See application file for complete search history.

(56) References Cited

U.S. PATENT DOCUMENTS

| | | | |
|---|---|---|---|
| 4,529,607 A | 7/1985 | Lenchin et al. | |
| 4,595,597 A | 6/1986 | Lenchin et al. | |
| 4,778,684 A | 10/1988 | D'Amico et al. | |
| 4,842,874 A | 6/1989 | D'Amico et al. | |
| 5,009,903 A | 4/1991 | deFigueiredo et al. | |
| 5,372,829 A * | 12/1994 | Chalupa et al. | 426/293 |
| 5,595,777 A * | 1/1997 | Chalupa et al. | 426/305 |
| 5,976,607 A | 11/1999 | Higgins et al. | |
| 6,010,736 A | 1/2000 | Motoi et al. | |
| 6,117,463 A | 9/2000 | Alexander et al. | |
| 6,177,111 B1 * | 1/2001 | Cortez | 426/94 |

(Continued)

FOREIGN PATENT DOCUMENTS

WO    WO 92/01384    *    2/1992

(Continued)

OTHER PUBLICATIONS

Papier Mache Paste Recipes, CanTeach, May 31, 2002 available at http://web.archive.org/web/20020531133036/http://www.canteach.ca/elementary/recipe6.html.*

(Continued)

*Primary Examiner*—Carolyn A Paden
(74) *Attorney, Agent, or Firm*—Buchanan Ingersoll & Rooney PC

(57) ABSTRACT

Frozen taquitos are made on a commercial scale by preparing a flour-based tortilla dough, shaping that dough into generally circular tortillas, baking the tortillas, applying a strip of filling to each baked tortilla, rolling the baked tortilla around the filling to form a filled tortilla, coating the tortilla with batter, frying the batter-coated filled tortillas, and freezing them. To reconstitute, the frozen taquito can be heated in a microwave oven.

19 Claims, 8 Drawing Sheets

U.S. PATENT DOCUMENTS

| | | | |
|---|---|---|---|
| 6,303,165 B1* | 10/2001 | Karner | 426/231 |
| 6,475,541 B1 | 11/2002 | Ekhart et al. | |
| 2004/0058048 A1* | 3/2004 | Chedid et al. | 426/551 |
| 2005/0031763 A1* | 2/2005 | Jensen et al. | 426/602 |

OTHER PUBLICATIONS

Tcupbutterfly, Homemade Tortilla's, Recipezaar, at http://www.recipezaar.com/64421 (Posted Jun. 12, 2003).*

* cited by examiner

US 7,704,537 B2

CRISPY FLOUR TAQUITO

REFERENCE TO PROVISIONAL APPLICATION

This application relies on and incorporates by reference U.S. Provisional Patent Application, Ser. No. 60/630,240, filed Nov. 25, 2004, for "Ethnic Mexican Foods" by W. Richard Dyer, Troy Bonata, Alecia Nelson, and Nicole Koenig.

FIELD OF THE INVENTION

This disclosure relates generally to commercial, ethnic food production. More particularly, it deals with production of frozen crispy taquitos which are preferably reconstituted by microwave energy.

BACKGROUND OF THE INVENTION

Methods and processes for applying batters to food products are, of course, known in the art. Among such methods and processes, for example, are U.S. Pat. No. 5,009,903 issued to deFigtueiredo et al., on Apr. 23, 1991, for a "Method of Making Fried Pie"; U.S. Pat. No. 4,842,874 issued to D'Amico et al. on Jun. 27, 1989, for a "Composition for Preparing Freeze-Thaw Microwaveable Pre-Fried Foodstuffs"; U.S. Pat. No. 4,778,684 issued to D'Amico et al. on Oct. 18, 1988, for a "Process for Producing a Freeze-Thaw Stable Microwaveable Pre-Fried Foodstuff"; U.S. Pat. No. 5,976,607 issued Nov. 2, 1999, to Higgins et al. for a "Water Dispersible Coating Composition for Fat-Fried Foods"; U.S. Pat. No. 6,475,541 issued Nov. 5, 2002, to Ekhart et al. for "Batter-Coated Food Products"; U.S. Pat. No. 6,010,736 issued Jan. 4, 2000, to Motoi et al. for "Steamed Durum Wheat Flour"; U.S. Pat. No. 4,529,607 issued Jul. 16, 1985 to Lenchin et al. for a "Process for Coating Foodstuff with Batter Containing High Amylose Flour for Microwave Cooking"; U.S. Pat. No. 4,595,597 issued Jun. 17, 1986, to Lenchin et al. for "Batters Containing High Amylose Flour for Microwaveable Pre-Fried Foodstuffs"; and U.S. Pat. No. 6,117,463 issued Sep. 12, 2000, to Alexander et al. for a "Process for Preparing Battered Foods".

SUMMARY OF THE INVENTION

A taquito is an ethnic food item generally of Mexican origin but which is modified to the taste and liking of non-ethnic people. It comprises a flour tortilla rolled into a generally cylindrical shape that can be filled with any of a variety of fillings. Typical fillings include, but are not limited to, ground or shredded meat or poultry, cheese, vegetables, sweet flavors, and the like.

A process for making taquitos results in a product comprising a filled tortilla having a fried coating selected from the group consisting of a diluted hydrocolloid, and a mixture of water and flour.

To reconstitute the taquito, the frozen taquito may be subjected to microwave heating without thawing. Alternatively, the frozen taquito may be heated with or without thawing in a conventional oven; however, the crispy characteristic of this invention is most preferably attained with the microwave heating method.

To prepare the frozen taquito, tortilla dough is separated into portion-sized generally circular disks using a dough cutting, press or stamping system, preferably a cutting system, and most preferably a die-cut system. A selected filling is deposited on a flattened disk near the center but offset from a diameter and from the peripheral edge. Then as much half the peripheral edge portion of the tortilla may receive an edible adhesive. To shape the taquito, a portion of the tortilla edge is folded over the filling and tucked under the filling. Next, the tortilla is rolled to obtain a generally cylindrical shape so that, when applied, the edible adhesive holds the tortilla in the generally cylindrical shape. After applying a coating of, for example, a diluted hydrocolloid, the product is fried to make the coated taquito. Then the coated taquito is frozen and packaged.

BRIEF DESCRIPTION OF THE DRAWING FIGURES

Many objects and advantages of this invention will be apparent to those skilled in the art when this specification is read in conjunction with the attached drawings wherein like reference numerals are applied to like elements and wherein.

DETAILED DESCRIPTION OF THE INVENTION

To make a crispy flour taquito according to this disclosure, several broad processes or steps are involved. First, tortilla dough having a flour-based composition, as opposed to a corn-masa-based composition, is prepared. Independently, the filling is prepared. Filling preparation may proceed concurrently or simultaneously with the tortilla dough preparation. When the tortilla dough has been shaped, baked, and filled, the resulting product is batter coated, fried, and frozen.

The frozen taquito is preferably prepared for consumption by microwave heating. Heating in a conventional oven is less preferred due to the longer time involved and the reduced benefit associated with the crispy coating.

Figure 1:
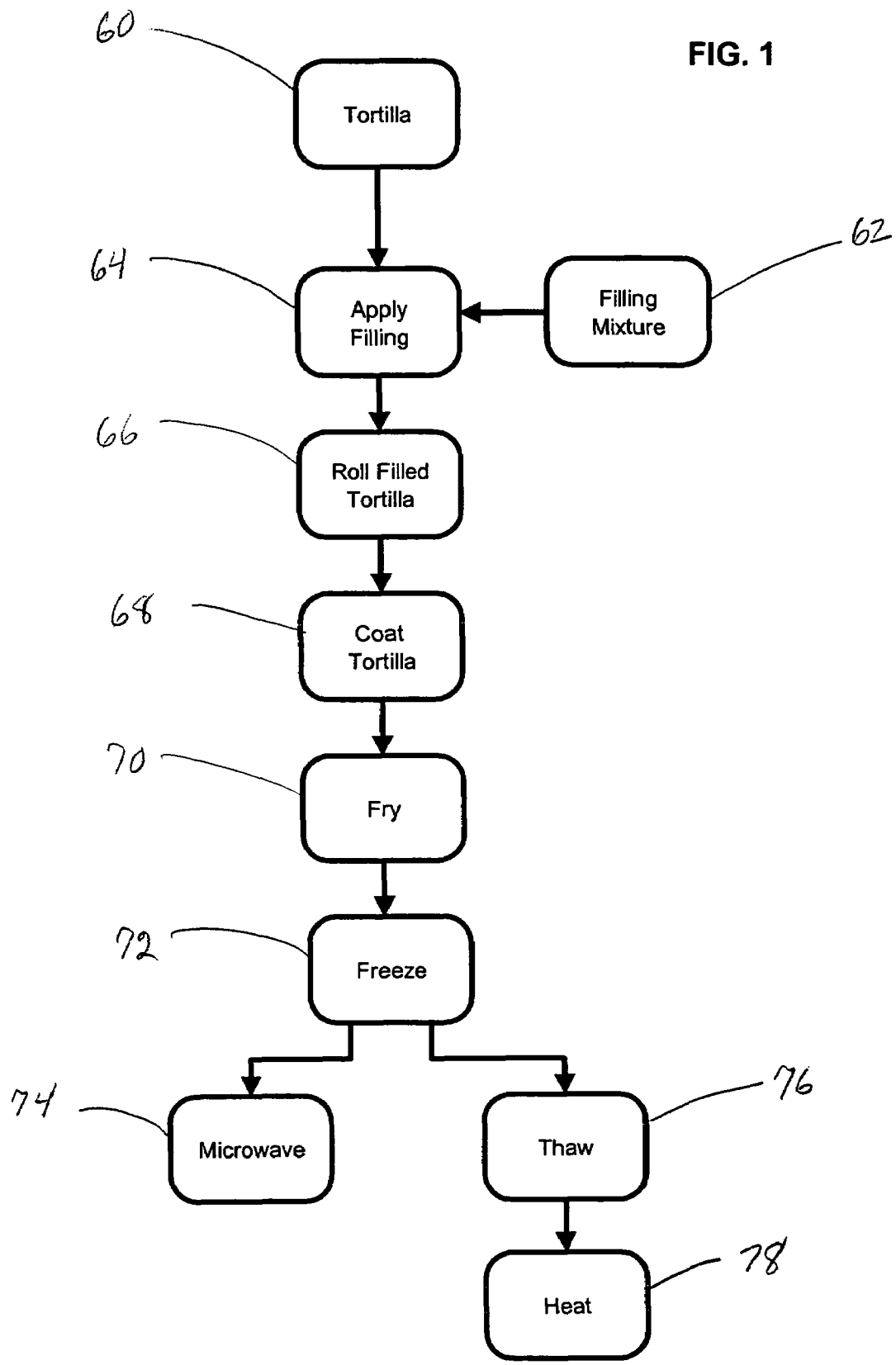
FIG. 1 is a schematic flow chart for manufacture of a crispy taquito.
Figure 2:
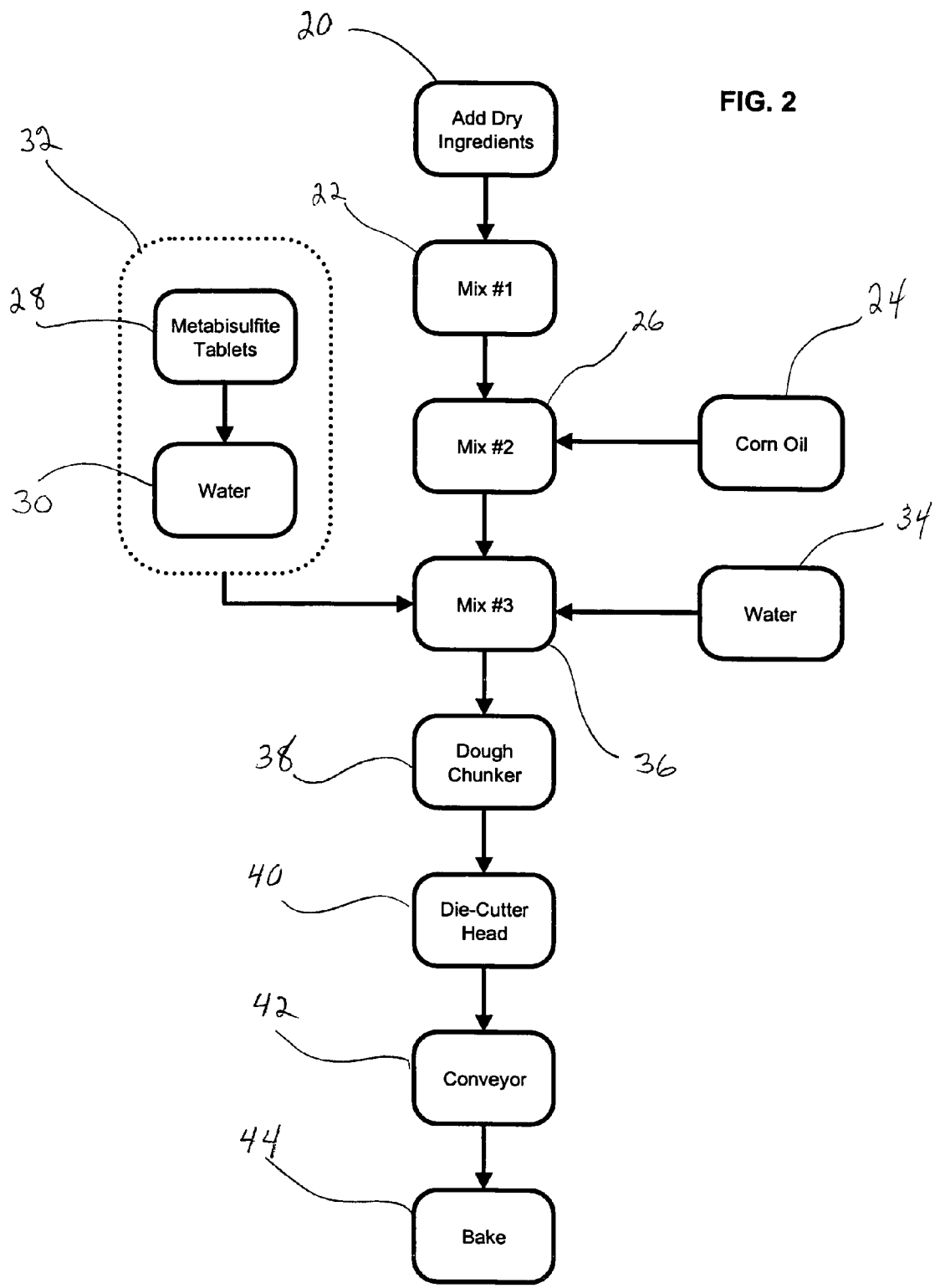
FIG. 2 is a schematic flow chart for manufacture of a tortilla.

Turning now to FIG. 1, tortillas 60 for the taquitos are prepared according to the procedure shown in FIG. 2 using either a batch and/or a continuous process. For simplicity the batch process is described here. More particularly, the tortilla manufacturing process starts by adding dry ingredients to the hopper of a suitable conventional kettle with an internal mixing system. A suitable kettle ought to have a capacity capable of processing a batch weighing up to about 2,000 pounds. These dry ingredients include flour to provide a base, provide product strength, product texture and product appearance. Another dry ingredient is a protein elevator that enhances product strength and machinability. Leavening agents comprise another dry ingredient. The leavening agents generate gas in the dough and provide texture and tenderness in the product. Preferably the flour used in these tortillas is wheat flour, rather than corn masa. Whey powder can be used as a suitable protein elevator. Baking powder and salt function as suitable leavening agents. Either a liquid or a dry dough conditioner is used in these tortillas. The dough conditioner relaxes the dough to provide consistent machinability for the most preferred size and shape. Typical liquid dough conditioners are obtained from a mixture of a dry dough conditioner and water. Where the dough conditioner is dry, it is also added to the mixer at this point. Table I sets out the preferred relative proportions for the dry ingredients.

TABLE I

| | |
|---|---|
| Wheat Flour | 60 to 66% |
| Salt | 0.2 to 0.7% |
| Whey Powder | 0.05 to 0.27% |
| Baking Powder | 0.05 to 0.57% |
| Dough Conditioner | 0.0005 to 0.01% |
| Vegetable Oil | 3 to 7% |
| Water | 26 to 32% |

With these dry ingredients in the kettle hopper, the mixing system runs slowly 22 for about one minute to thoroughly blend these ingredients. A typical slow speed mix 26 involves operating the mixing system at about 35 rpm, whereas a typical fast speed mix involves operating the mixing system at about 70 rpm.

The next step involves introducing vegetable oil 24 at a temperature of about 70° F. into the kettle hopper. For purposes of making these tortillas, corn oil is the preferred vegetable oil. A second slow mixing step 26 is performed by operating the mixing apparatus for about one minute at a slow speed.

If a liquid dough conditioner 32 is used, it is introduced at this time. Metabisulfite tablets constitute a most preferred dry dough conditioner. The preferred metabisulfite tablets are known commercially as Parlax tablets and include sodium metabisulfite, corn starch, microcrystalline cellulose, and dicalcium phosphate. By dissolving metabisulfite tablets 28 in a fixed quantity of water 30, metabisulfite enters the process as a wet or liquid dough conditioner solution 32. By way of example, 6 metabisulfite tablets may preferably be dissolved in about 12 pounds of water. After the dough conditioner solution 32 has been added, a third slow mix 36 is performed for about 7 minutes. During this third mix 36, water 34 at a preferred temperature range of about 55° to about 60° F. is preferably added using a conventional volumetric meter. When water is cooler than this preferred range, the resulting dough is too tough and requires too much time to process. When water is warmer than this preferred range, the resulting dough is too soft and processes too quickly.

After the third slow mixing step 36, the dough is allowed to rest in the mixer to develop. The rest period for the dough preferably lies in the range of 5 to 30 minutes and most preferably lies in the range of 5 to 10 minutes. The rest period is selected such that the dough temperature reaches a preferred temperature range of about 75 to about 85° F. and the dough is medium to fully developed. This preferred rest period provides acceptable workability and extensibility for the dough. Shorter rest times yield under-developed dough which is too tough for suitable processing; whereas, longer rest times yield over-developed dough which is too soft for suitable processing.

After the rest period, the developed dough can be divided into pieces, preferably by dumping it into a suitable conventional dough chunker 38, although any other means of dividing the dough can be used such other types of equipment or by hand. The dough chunker 38 divides the dough into small sheets which then pass to a dough cutting, press, or stamping system, preferably a cutting system, and most preferably the die-cutter head 40 of a suitable conventional die cut system. The die-cutter head 40 subdivides the sheets into generally circular tortilla disks corresponding in weight and size to that of an individual tortilla. For example, a prebaked weight in the range of about 0.88 to about 0.92 oz. (i.e., 25 to 26.1 g) is preferred for a tortilla with a 5 inch nominal diameter. Nominal diameters for the tortillas preferably lie in the range of about 5 to about 6 inches with a tolerance of about 0.25 inches, although tortillas with nominal diameters ranging from 2.5 to 12 inches are known and used.

These tortilla disks are positioned on a conveyor 42. Preferably, the tortilla disks have a substantially uniform thickness because increased thickness has been found to cause a mushy mouth feel when the taquitos heated for ultimate use. Subsequently, the tortilla disks are baked 44 by conveying them through a suitable conventional oven where baking occurs at about 400° F. After baking, the tortilla is normally soft, pliable, and tender in the center. Moreover, after baking, a tortilla having a nominal 5 inch diameter has a preferred weight in the range of about 0.69 to about 0.72 oz. (19.7 to 20.3 g) and a preferred thickness in the range of about 0.038 to about 0.042 inches. For a constant thickness, tortilla weight varies generally as the square of the diameter; accordingly, tortillas with different nominal diameters will have appropriately adjusted weight ranges.

While any desired filling may be used in making the taquitos disclosed here, several preferred fillings will now be described.

Figure 3:
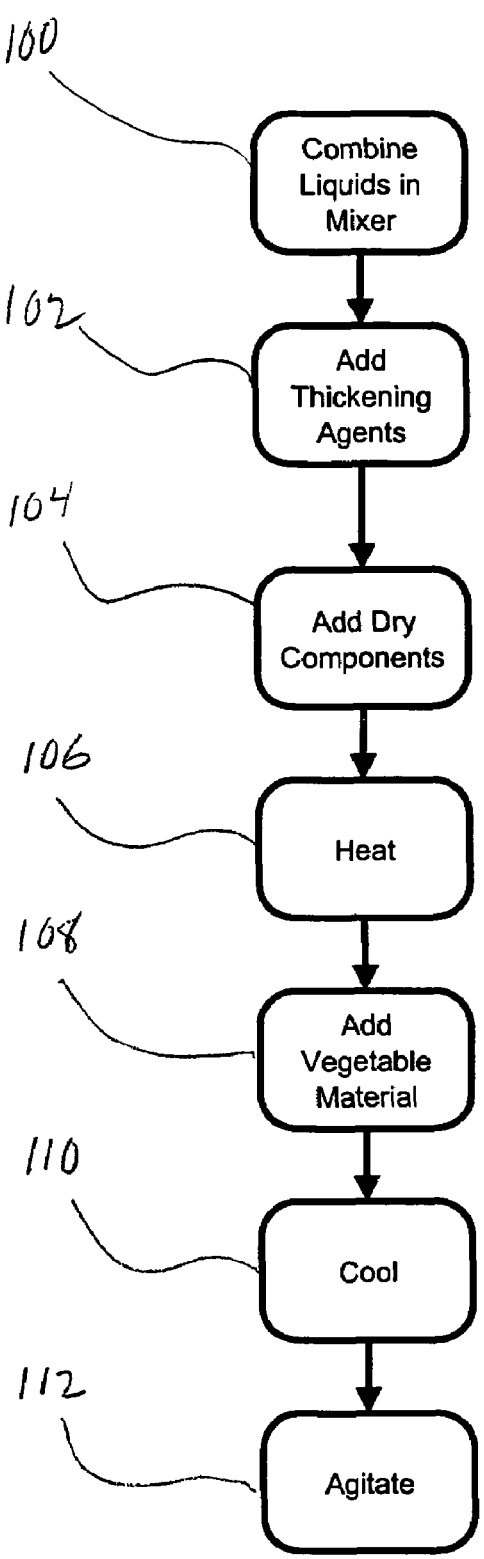
FIG. 3 is a schematic flow chart for manufacture of a tomatillo salsa.

One such preferred filling is a chicken in tomatillo salsa. Production of a suitable tomatillo salsa begins (see FIG. 3) by combining 100 in a suitable conventional mixer, kettle, or mixing container, water, crushed tomatillos, soy sauce and jalapeno peppers in brine. Next, thickening additives 102 are added to the mixer. Suitable conventional thickening additives include modified food starch (e.g., Col-Flo) for color retention, clarity, and smoothness; gelatin; xanthum gum, and the like. The liquids and additives are mixed until the thickening agents are fully dissolved. At that time, dry ingredients 104 such as salt, chipotle pepper, Chinese garlic, and chicken base may be added and further mixed.

The mixture is then heated 106 to a minimum temperature of about 190° F. to activate the thickeners and cook the tomatillos, garlic, and other uncooked additives. Chopped vegetable materials including, for example, onion and cilantro, are then added 108. The mixture is then cooled 110 to a temperature in the range of about 35-40° F. This temperature range is preferred as it aids pre-processing efficiency. Moreover, this first cooling step is the first of two cooling steps and this first cooling step is a less costly process. Agitation 112 of the tomatillo salsa continues at a medium speed to keep solid components from settling out and to keep the tomatillo salsa well-mixed.

Figure 4:
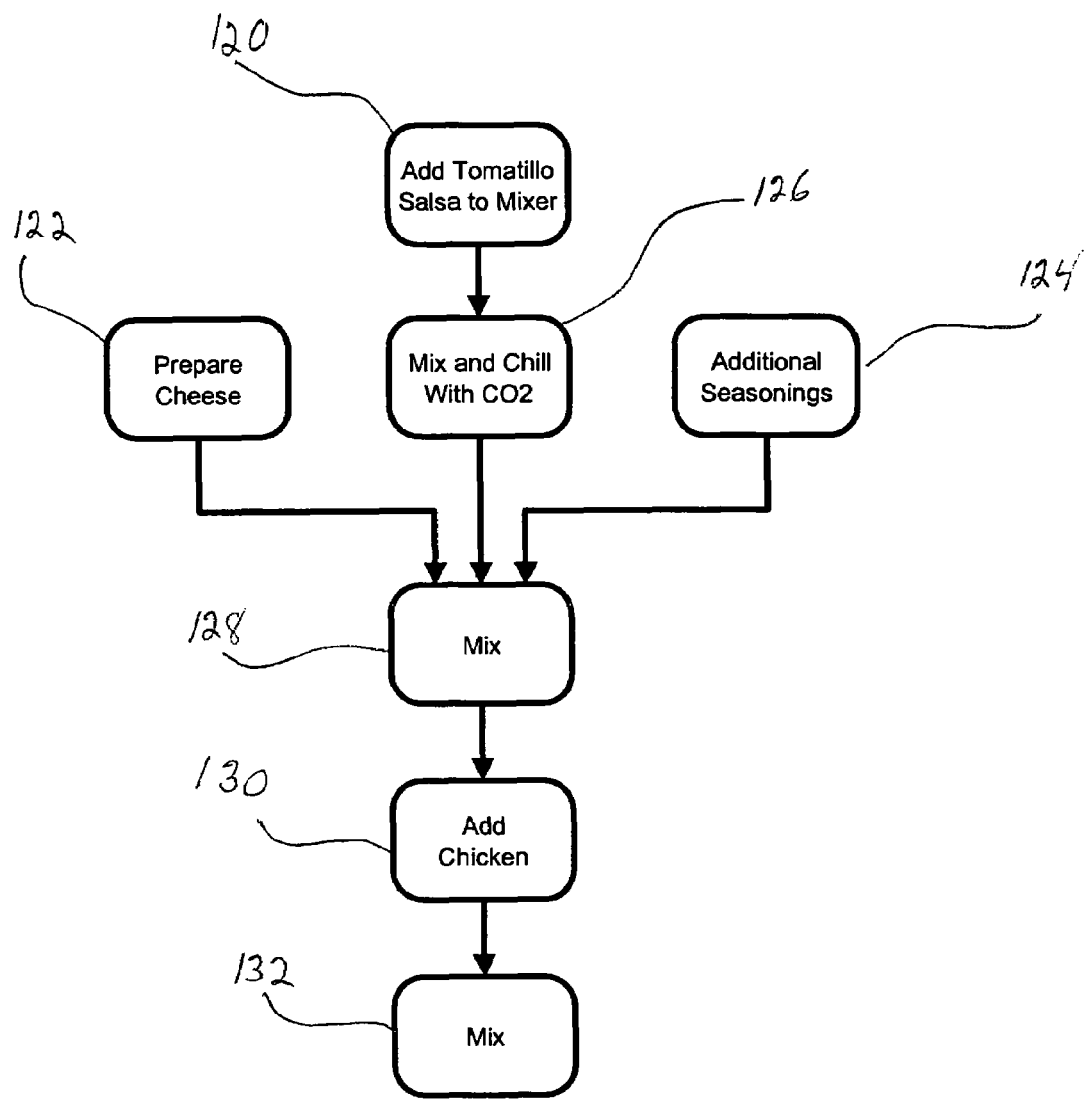
FIG. 4 is a schematic flow chart for manufacture of a taquito filling.

The tomatillo salsa may then be added to another mixer 120 (see FIG. 4), such as a cooling-jacketed mixer with $CO_2$ injection, where further mixing 126 and the second cooling step occur. Preferably, $CO_2$ injection is used for cooling in the second cooling step; however, other cooling processes such as ammonia cooling or cold water jacket heat transfer may be substituted. The $CO_2$ injection is most preferred in this process though because the direct injection of cold gaseous carbon dioxide permeates the mixer and gives rapid cooling without any chemical reaction or dilution of the product.

A suitable cheese, such as pepper jack cheese or a flavored cheese, is prepared 122 for use by cutting and shredding it to a size approximating about 0.25"× about 0.375"× about 1.5". The prepared cheese is then added to the mixer.

Desired proportions of seasonings 124 are then added to the mixer. Typical seasonings may include black pepper and cumin. At the same time, chicken, onion, methylcellulose ("Methocel"), pepper pods (poblano), flavor enhancers (e.g., I+G), and texture improving additives (e.g., Textaid), may be added to the mixer. The chilled salsa, prepared cheese, and additional seasonings are mixed for about a minute and a half while temperature is maintained in a range of about 10° to about 80° F., preferably in a range of about 10° to about 40° F., and most preferably at about 25° F. The range of 10 to 40° F. is preferred because with temperatures below about 40° F. microbial food contamination problems are avoided and USDA production line cleaning requirements are reduced. The final preparation step includes adding bagged, precooked chicken 130, preferably in the form of pieces and most preferably in shredded form, and mixing the chicken with the salsa. All ingredients are then mixed 132.

Figure 5:
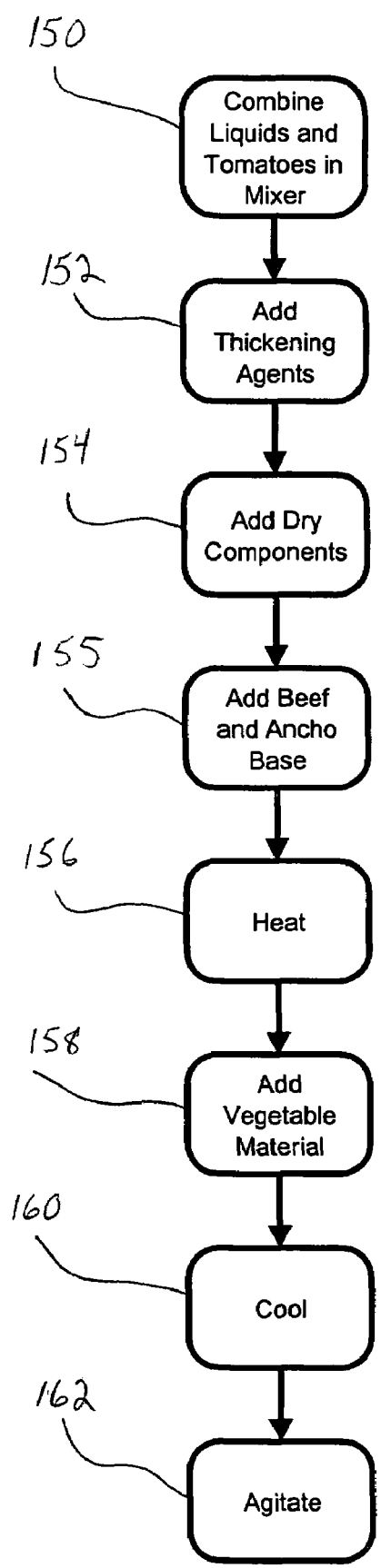
FIG. 5 is a schematic flow chart for manufacture of a beef paste.

Another suitable filling may be a beef and cheddar cheese combination. Production of a beef paste for use in a beef and cheddar taquito begins (see FIG. 5) by combining 150 in a suitable conventional kettle having internal mixing apparatus hot water (e.g., about 170° F.), diced tomatoes, and vegetable oil. Corn oil is the preferred vegetable oil. Next, thickening additives 152 are slowly added to the mixer. Suitable conventional thickening additives include modified food starch (e.g., Col-Flo) for color retention, clarity, and smoothness; gelatin; xanthum gum, and/or the like. The liquids and additives are mixed until the thickening agents are fully dissolved. At that time, dry ingredients 154 such as salt, sugar, granulated garlic, chipotle pepper, oregano, whey, and condiments may be added and further mixed.

Conventional beef paste, and conventional ancho base are then added 155 to the mixture which is subsequently heated 156 to a minimum temperature of about 190° F., long enough to activate the thickeners and cook the tomatoes, as well as other uncooked additives. Chopped vegetable materials including, for example, green pepper, are then added 158. The mixture is then cooled 160 to a temperature in the range of about 35° to about 40° F. Agitation 162 of the paste beef continues at a medium speed to keep solid components from settling out and to keep the paste beef well-mixed.

Figure 6:
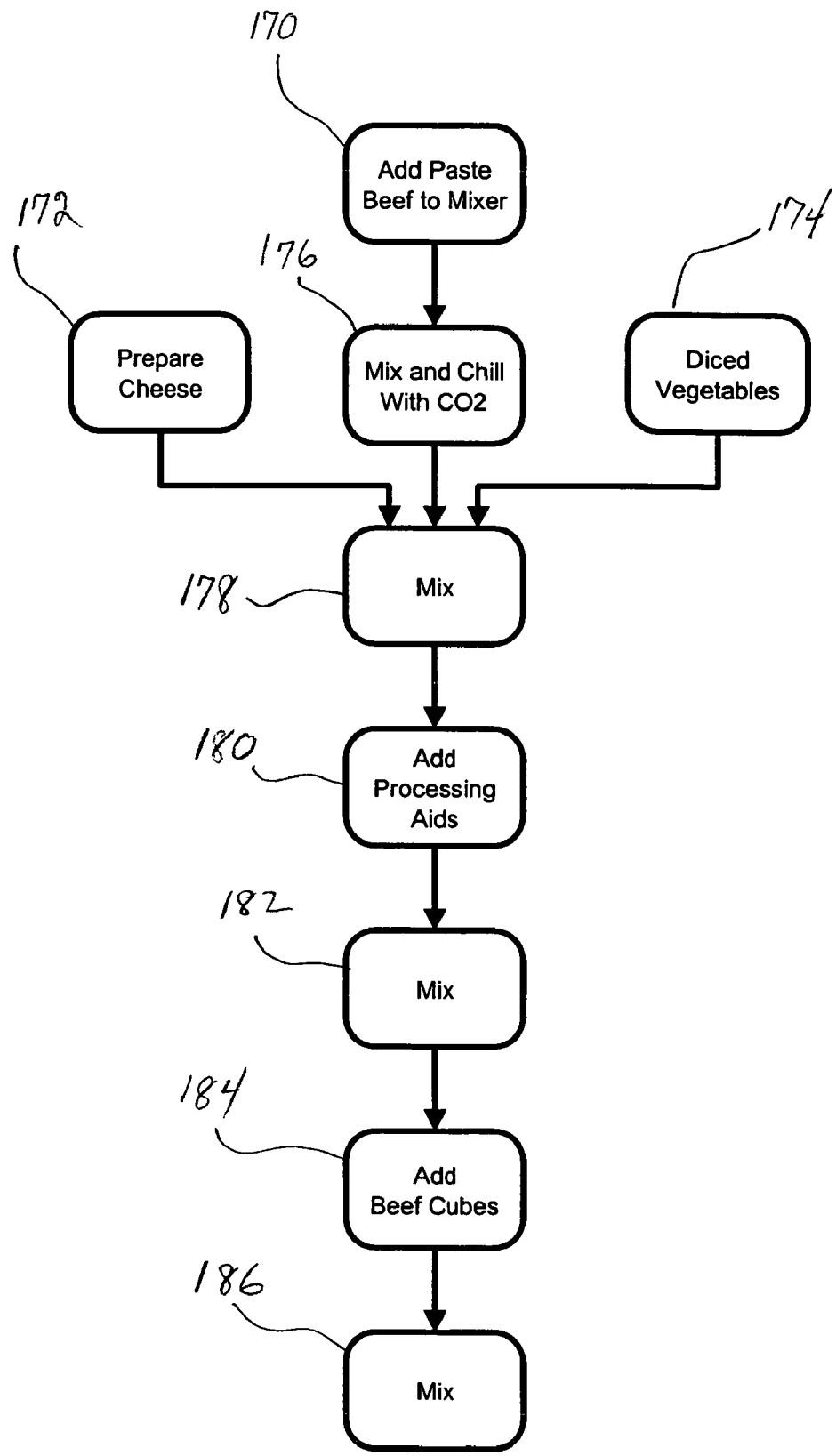
FIG. 6 is a schematic flow chart for manufacture of a beef and cheddar filling.

The paste beef may then be added to another mixer 170 (see FIG. 6) where mixing 176 and chilling with $CO_2$ occurs. A suitable cheese, such as shredded Colby cheddar, is prepared 172 for use by cutting and shredding it to pieces with a size approximating about 0.25"× about 0.375"× about 1.5". Next, the cheese is added to the mixer.

Desired proportions of diced vegetables 174 are then added to the mixer. Typical diced vegetables include red bell peppers and onions. Next, the mixer runs for about one and a half minutes 178. Then, methylcellulose ("Methocel"), pepper pods (poblano), flavor enhancers (e.g., I+G), and texture improving additives (e.g., Textaid), may be added 180 to the mixer and mixed 182 for an additional 20-25 seconds at a high speed. The final preparation step includes adding precooked beef 184 as shreds, pieces, or other comminuted forms and mixing it 186 at a high speed of about 70 rpm. The beef pieces 184 are preferably cubed beef pieces and most preferably precooked ground beef.

The resulting beef and cheddar filling will have the consistency of melted cheese with identifiable beef shreds.

Figure 7:
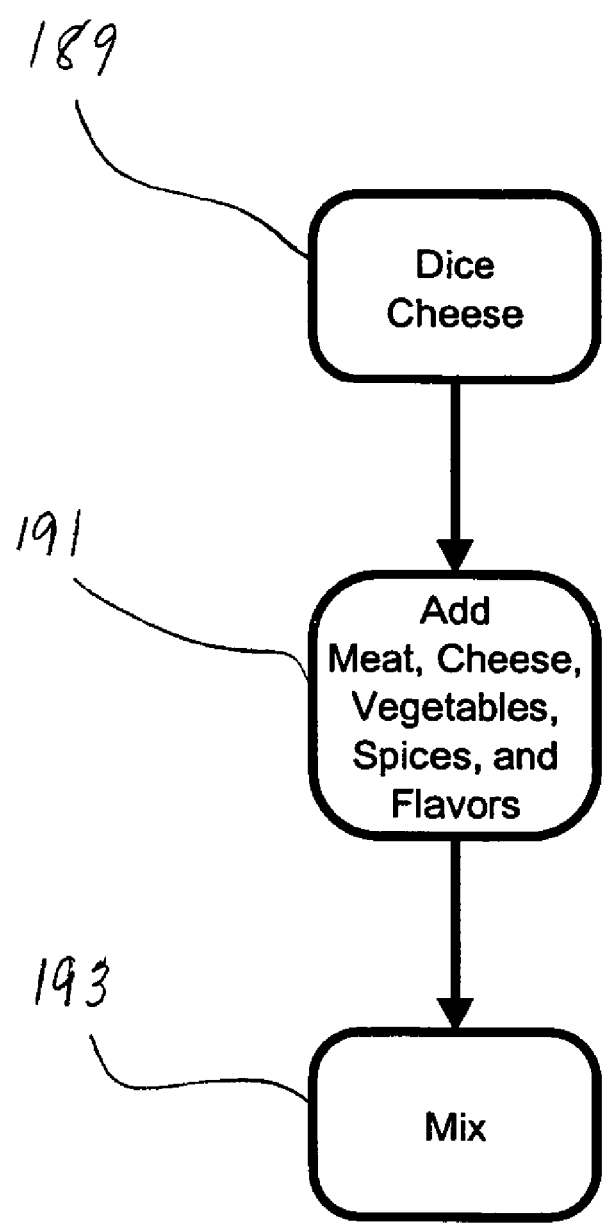
FIG. 7 is a schematic flow chart for other fillings.

Another suitable filling is a steak and cheese filling (see FIG. 7). For this filling, a suitable cheese, such as pepper jack cheese, is diced 189 to cubes of about 0.25 inches. The cubed cheese is added to the hopper of a mixer along with strips of steak, high melt cheddar cheese, Monterey jack cheese sauce, diced red and green peppers, diced onions, cilantro, sale wood-fired grill flavor, and Ultrasperse (a precooked waxy corn starch). The mixer operates 193 for about 50 to about 70 seconds to complete the mixing of these ingredients. Upon completion of the mixing step, the filling has the appearance of steak strips with little pieces of cheddar cheese along with red and green bell pepper. This filling may have a strong grilled flavor and a mild cheese and steak flavor. The filling also has a mouth consistency of cheese with tender pieces of steak. The temperature of this filling is adjusted so as to lie in the range of about 27° to about 35° F.

Another chicken and cheese filling can be produced by combining, in the hopper of a mixer, water, Monterey jack cheese sauce, diced tomatoes, freeze dried sauteed white onion; sliced green onions, mild green chilies, diced bell peppers, cilantro, cooked chicken meat, diced precooked bacon, Colby cheese, modified food starch (e.g., Ultrasperse), methocel, and hickory grill flavoring. When all the ingredients are loaded, the mixer is operated for about 45 to about 90 seconds to thoroughly blend the ingredients. The filling has a greenish brown color with chicken shreds and pieces, diced bacon, tomatoes, cheese, and green chili pepper pieces. This filling also has a strong grilled flavor infused with bacon flavor as well as a mild chicken and cheese flavor. The filling has a mouth consistency of melted cheese with tender chicken pieces. The temperature of this filling is adjusted to be in the range of about 35° to about 40° F.

After the tortillas and the filling have been prepared (see FIG. 1), the filling mixture 62 is supplied and applied 64 to the individual tortillas. Preferably, the filling mixture 62 is made using standard blending and mixing processes. The filling preferably may be pumped through a vacuum displacement unit, and dispensed onto the tortillas by extrusion through a generally circular orifice having a diameter in the range of about 0.52 inch to about 0.62 inches. Alternatively, the filling can be accomplished by hand, by other extrusion systems, or by knock-out type systems. The filling preferably has a soft to medium consistency when applied to the tortilla so that the filling holds its shape and is pliable. For tortillas with a nominal diameter of 5 inches, a preferred quantity of filling is about 0.70 to about 0.0.72 oz. (i.e., 19.8 to 20.4 g). Where the tortilla has a different nominal diameter, the filling weight needs corresponding adjustment. When the filling is applied to the tortilla, the filling does not extend all the way to the tortilla edge, preferably the filling is spaced from the opposed tortilla edges by about 0.4 inch to about 0.5 inches at each end of the filling. Preferably the filling is positioned on the tortilla such that it is both offset from a generally parallel diameter of the tortilla and inset from the peripheral edge of the tortilla, i.e., a longitudinal axis of the filling is generally parallel to, but offset from, a diameter of the tortilla.

To hold the assembled taquito together, a suitable edible adhesive may be applied to part of the tortilla. Specifically the edible adhesive is preferably applied to a segment of the tortilla which will become part of the outside after rolling. Stated differently, the edible adhesive is applied to a segment of the tortilla defined by the generally circular circumference of the tortilla and a chord which is parallel to the filling axis but which is on the opposite side of the diameter parallel to the filling axis. The maximum distance between the chord and the circumference of the segment preferably lies in the range of about 1 to about 2 inches. When used, the edible adhesive is preferably a mixture of water and flour. Most preferably, about 60 wt. % of water is thoroughly mixed with about 40 wt. % of flour to make the edible adhesive.

After the filling has been dispensed onto the tortillas, the individual tortillas are rolled 66. During the rolling step, the edge portion of the tortilla is folded over the filling, and tucked under the filling adjacent to a diameter of the tortilla. Then the tortilla and filling are rolled over the remaining portion of the tortilla having the band of edible adhesive, when used, so that the edible adhesive holds the assembled taquito in its generally cylindrical shape. When the edible adhesive is not used, the upper surface of the tortilla may be lightly sprayed with water. The water will provide a similar adhesive functionality. When the rolling step is finished, the taquito has a diameter in the range of about 0.9 to about 1.0 inches where the tortilla used has a nominal diameter of 5 inches. As thus assembled, the tortilla surrounds the filling, except at the open ends of the rolled tortilla, and attains a generally cylindrical shape.

Figure 8:
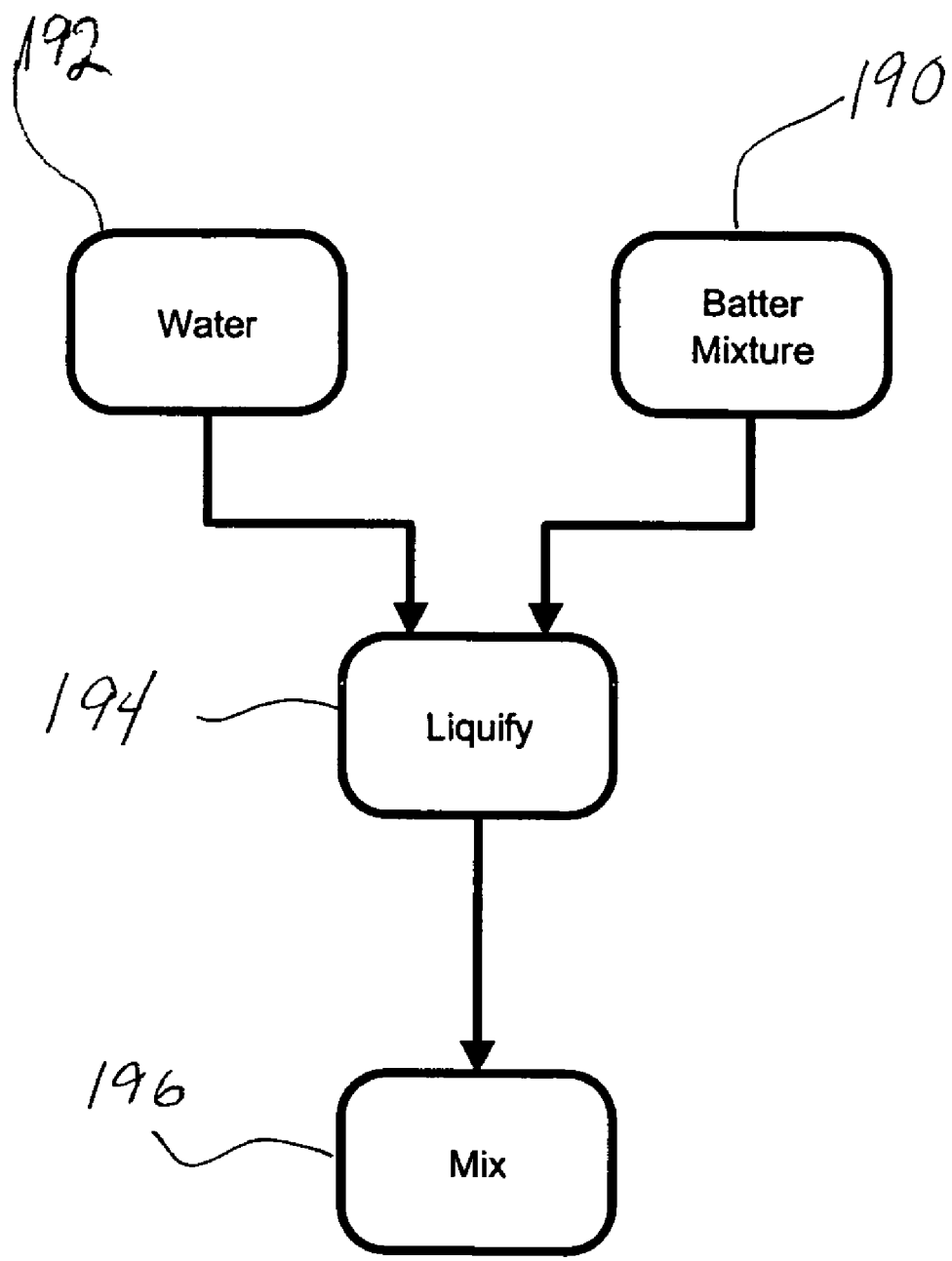
FIG. 8 is a schematic flow chart for manufacture of a crispy coating.

The rolled, filled tortillas then pass through a suitable conventional waterfall coating device or other suitable conventional bath where a batter coating is applied to the outside of the tortilla 68. Preferably, a coating weight of about 0.099 to about 0.106 oz. (i.e., 2.8 to 3.0 g) is applied to each taquito where the tortilla has a nominal diameter of 5 inches. The preferred composition of the batter is made by combining about 40% dry batter mixture 190 (see FIG. 8) and about 60% water 192 in a suitable conventional liquefier 194 where the batter and water are mixed 196 until the batter mixture is completely dissolved. Components of the most preferred dry batter mixture are set out in Table II below.

TABLE II

| | |
|---|---|
| Modified Food Starch | 30 to 60% |
| Degermed White Corn Flour | 15 to 38% |
| Bleached Enriched Wheat Flour | 12 to 35% |
| Salt | 2 to 9% |
| Leavening | 1.3 to 6% |
| Defatted Soy Flour | 0.2 to 3% |
| Whey | 0.2 to 3% |
| Spice Extractives | 0.1 to 2.9% |
| Spice | 0.02 to 2% |
| Malted Barley Flour | 0.02 to 1.9% |
| Polysorbate 80 | 0.018 to 1.5% |
| Soybean Oil | 0.018 to 1.5% |

As an alternative, the coating can be made by a simple combination of about 20% flour and about 80% water, which combination has been liquefied.

Next, (FIG. 1) the coated taquito is preferably fried in vegetable oil at a temperature in the range of 350 to 400° F. for 25 to 45 seconds. The cooking oil may be maintained at a most preferred temperature in the range of about 365° to about 370° F. while the most preferred frying time is about 3 to about 37 seconds. With this high temperature, the cooking time is relatively short. The preferred vegetable oil for frying is corn oil.

Immediately after the frying step 70, the taquitos are frozen 72, packaged, and distributed for consumers. The preferred freezing step includes use of a spiral freezer where the taquitos can be frozen to a temperature of ≦25° F. in about 30 to about 35 minutes.

To prepare the frozen taquitos for consumption, microwave heating 74 is preferably used. This product may be microwave heated for about 2 minutes without using an added convection material(s) such as a heater board, a microwave susceptor, or the like. Alternatively, the frozen taquitos can be (i) thawed 76 and then heated 78 or (ii) immediately heated 78, in a conventional oven or other heating device, but conventional heating is less preferable due to the time involved and the lower need for a crispy coating with the conventional heating method.

In this description, the various references to percentages are references to percentages by weight, unless otherwise indicated. Moreover, where a numerical value is given for particular parameter, and where the numerical value is introduced by the term "about", each such numerical value is specifically intended to include any value within 5% of the numerical value stated, unless the context indicates otherwise. Moreover, it should be noted that the processing sequences, times, and temperatures described herein have been found to be optimized for the product being produced.

It will now be apparent to those skilled in the art that a new, and improved process for making a crispy taquito has been described. It will also be apparent to those skilled in the art that numerous modifications, variations, substitutions, and equivalents exist for features of the process and resulting product. Accordingly, it is expressly intended that all such modifications, variations, substitutions, and equivalents which fall within the spirit and scope of the invention as defined by the appended claims shall be embraced thereby.

What is claimed is:

1. A process for making a taquito including the steps of:
providing a cooked tortilla having a filling;
coating the cooked tortilla with a batter selected from the group consisting of a hydrocolloid batter and a batter mixture of flour and water;
frying the coated, filled cooked tortilla to form a fully cooked, fried taquito; and
freezing the fully cooked, fried taquito.

2. The process of claim 1 wherein the frozen taquito is reconstituted with microwave energy.

3. The process of claim 2 wherein the reconstitution step is free of a microwave susceptor board.

4. The process of claim 2 wherein the reconstitution step is free of a microwave heater board.

5. The process of claim 1 wherein the step of providing a tortilla includes providing a flour tortilla.

6. The taquito of claim 1 wherein the batter mixture includes modified food starch.

7. The taquito of claim 6 wherein the batter mixture includes white corn flour, wheat flour, and soy flour.

8. The taquito of claim 1 wherein the batter mixture includes spices and salt.

9. The taquito of claim 1 wherein the batter mixture includes modified food starch, white corn flour, wheat flour, soy flour, leavening, salt, spices, and whey.

10. The process of claim 1 wherein the step of providing a tortilla includes the steps of:
blending flour based dry ingredients by mixing them;
adding vegetable oil to the dry ingredients and mixing a second time;
adding a liquid dough conditioner and starting a third mixing step;
introducing water during the third mixing step using a volumetric control to obtain tortilla dough;
shaping the tortilla dough into generally circular disks; and
baking the generally circular disks.

11. The process of claim 10 further including the step of holding the filled tortilla in a generally cylindrical shape using an edible adhesive.

12. The process of claim 11 wherein the edible adhesive is made by mixing 60 wt. % water with 40 wt. % flour.

13. A taquito comprising:
a fully cooked flour tortilla shell;
a fully cooked filling; and
a fully fried coating on the tortilla shell selected from the group consisting of a diluted hydrocolloid batter and a batter mixture of flour and water.

14. The taquito of claim 13 which is frozen.

15. The taquito of claim 13 wherein the batter mixture comprises 20% flour and 80% water.

16. The taquito of claim 13 wherein the hydrocolloid batter comprises sodium metabisulfite.

17. A process for making a taquito including the steps of:
providing a cooked tortilla having a filling;
coating the cooked tortilla with a batter mixture of flour and water;
frying the coated, filled cooked tortilla to form a fully cooked, fried taquito; and
freezing the fully cooked, fried taquito,
wherein the step of providing a tortilla includes the steps of: blending flour based dry ingredients by mixing them; adding vegetable oil to the dry ingredients and mixing a second time; adding a liquid dough conditioner and starting a third mixing step; introducing water during the third mixing step using a volumetric control to obtain tortilla dough; shaping the tortilla dough into generally circular disks; and baking the generally circular disks.

18. The process of claim 17 further including the step of holding the filled tortilla in a generally cylindrical shape using an edible adhesive.

19. The process of claim 17 wherein the edible adhesive is made by mixing 60 wt. % water with 40 wt. % flour.

\* \* \* \* \*